United States Patent
Li et al.

(10) Patent No.: US 9,774,235 B2
(45) Date of Patent: Sep. 26, 2017

(54) MODIFIED WAVE WINDINGS FOR ELECTRIC MOTOR

(71) Applicant: Johnson Electric S.A., Murten (CH)

(72) Inventors: Yongbin Li, Hong Kong (CN); Xiaowu Xie, Shenzhen (CN); Jianguo Guo, Shenzhen (CN); Xianming Wu, Shenzhen (CN)

(73) Assignee: Johnson Electric S.A., Murten (CH)

( * ) Notice: Subject to any disclaimer, the term of this patent is extended or adjusted under 35 U.S.C. 154(b) by 783 days.

(21) Appl. No.: 14/109,821

(22) Filed: Dec. 17, 2013

(65) Prior Publication Data

US 2014/0167553 A1 Jun. 19, 2014

(30) Foreign Application Priority Data

Dec. 18, 2012 (CN) .......................... 2012 1 0551999

(51) Int. Cl.
*H02K 13/00* (2006.01)
*H02K 23/28* (2006.01)
(Continued)

(52) U.S. Cl.
CPC .............. *H02K 23/28* (2013.01); *H02K 23/26* (2013.01); *H02K 23/30* (2013.01)

(58) Field of Classification Search
CPC ........ H02K 13/04; H02K 23/08; H02K 23/26; H02K 23/30; H02K 13/00
(Continued)

(56) References Cited

U.S. PATENT DOCUMENTS

| | | | | |
|---|---|---|---|---|
| 5,202,599 A | * | 4/1993 | Kao | ........................ H02K 23/28 310/154.47 |
| 7,602,092 B2 | * | 10/2009 | Roos | ........................ H02K 3/28 310/198 |

(Continued)

FOREIGN PATENT DOCUMENTS

| | | | |
|---|---|---|---|
| FR | 2841400 | 12/2003 | |
| FR | 2841400 A1 | * 12/2003 | ............. H02K 23/26 |
| JP | 2005341654 | 12/2005 | |

OTHER PUBLICATIONS

Office Action from the corresponding Chinese application No. 201210551999.X dated Apr. 5, 2017, 9 pages.

*Primary Examiner* — Joshua Benitez-Rosario
*Assistant Examiner* — Leda Pham
(74) *Attorney, Agent, or Firm* — Muncy, Geissler, Olds & Lowe, P.C.

(57) ABSTRACT

A permanent magnet DC motor with 2P magnetic poles, where P is an integer greater than 1, comprising a stator (100) with a plurality of magnetic components, and a rotor (104) configured to rotate relative to the stator. The rotor may comprise a commutator and a rotor core with a plurality of rotor teeth (106) defining a plurality of rotor grooves (108), wherein the rotor grooves accommodate a plurality rotor windings. In some embodiments, the commutator comprises a plurality m of commutator bars (Z), wherein m is an even number greater than 2. The rotor windings comprises a plurality of coil elements (W), wherein a coil element comprises two ends connecting a pair of commutator bars, such that a first pair of adjacent commutator bars is connected through P−1 serially connected coil elements, and a second pair of adjacent commutator bars is connected through P+1 serially connected coil elements.

11 Claims, 9 Drawing Sheets

(51) Int. Cl.
*H02K 23/26* (2006.01)
*H02K 23/30* (2006.01)

(58) Field of Classification Search
USPC .................. 310/198–209, 180, 184, 234
See application file for complete search history.

(56) References Cited

U.S. PATENT DOCUMENTS

| | | | |
|---|---|---|---|
| 7,619,344 B2* | 11/2009 | Osawa | H02K 23/28 |
| | | | 310/198 |
| 2004/0021394 A1* | 2/2004 | Maeda | H02K 23/26 |
| | | | 310/233 |
| 2007/0216255 A1* | 9/2007 | Weigold | H02K 23/26 |
| | | | 310/234 |
| 2011/0012470 A1 | 1/2011 | Li et al. | |
| 2011/0023798 A1 | 2/2011 | Qin et al. | |

* cited by examiner

MODIFIED WAVE WINDINGS FOR ELECTRIC MOTOR

CROSS REFERENCE TO RELATED APPLICATION(S)

This application claims the benefit of Chinese patent application serial no. 201210551999.X, filed on Dec. 18, 2012. The entire content of the aforementioned patent application is hereby incorporated by reference for all purposes.

BACKGROUND

A conventional four pole permanent magnet electric motors typically uses four brushes. For example, FIG. 1A illustrates a stator 100 of a four pole permanent magnet electric motor having four brushes 102 for which to contact a commutator comprising a plurality of commutator bars. FIG. 1B illustrates a rotor 104 for the four pole permanent magnet electric motor, wherein rotor 104 has twenty rotor teeth 106 defining twenty rotor grooves 108.

Referring also to FIG. 1C, brushes 102 are configured to interface with a plurality of commutator bars 110 on rotor 104. A plurality of windings 112 are connected to the commutator bars 110 and wrapped around rotor teeth 106 and accommodated in rotor grooves 108. During operation, current is transferred from brushes 102 to windings 112 via commutator bars 110, thereby generating magnetic fields interacting with a plurality of magnetic components (e.g., permanent magnets) mounted on stator 100 driving rotor 104 to spin relative to the stator 100. FIG. 1C illustrates a schematic diagram of an exemplary layout for windings 112 arranged in a lap winding configuration. For ease of understanding, FIG. 1C illustrates commutator bars 110 and rotor teeth 106 linearly.

For certain applications, it is desirable to reduce the number of brushes of the electric motor, thereby decreasing manufacturing costs and lowering the complexity of assembly. For example, FIG. 2A illustrates a permanent magnet electric motor 200 with four magnetic poles, but having only two electric brushes (21 and 23) instead of four.

One method of reducing the number of brushes is to use an equalizer selectively connecting the commutator bars of the electric motor. However, the equalizer also adds manufacturing costs and assembly complexity. For example, FIG. 2B illustrates a schematic diagram of an exemplary layout for windings 112 using equalizer 114.

Another method of reducing the number of brushes in the electric motor is to utilize wave windings instead of lap windings. However, typical wave winding configurations require the commutator to have an odd number of commutator bars, requiring a separate commutator and rotor design from conventional motors, potentially increasing manufacture and assembly costs.

Accordingly, it would be advantageous to reduce the manufacturing costs and assembly complexity of an electric motor by utilizing a reduced number of brushes and a commutator having an even number of commutator bars.

SUMMARY

Some embodiments are directed towards a permanent magnet DC motor with reduced manufacturing costs and assembly complexity, by having fewer electric brushes and a commutator with an even number of commutator bars. The motor is configured to have 2P magnetic poles, where P is an integer greater than 1, and comprises a stator with a plurality of magnetic components, and a rotor configured to rotate relative to the stator. The rotor may comprise an output shaft, a commutator attached to the output shaft, a rotor core with a plurality of rotor teeth defining a plurality of rotor grooves, wherein the rotor grooves accommodate a plurality rotor windings rotor windings. In some embodiments, the commutator comprises a plurality m of commutator bars arranged to form m pairs of adjacent commutator bars, wherein m is an even number greater than 2. The rotor windings comprises a plurality of coil elements arranged in a modified wave winding configuration, wherein a coil element comprises two ends connecting a pair of commutator bars, such that a first pair of adjacent commutator bars is connected through P−1 serially connected coil elements, and a second pair of adjacent commutator bars is connected through P+1 serially connected coil elements.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered which are illustrated in the accompanying drawings. These drawings depict only exemplary embodiments and are not therefore to be considered limiting of the scope of the claims.

DETAILED DESCRIPTION

Figure 1B:
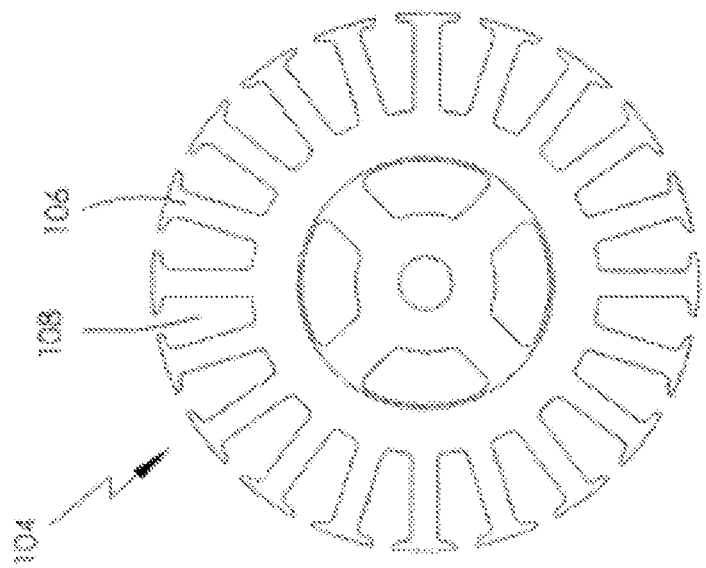
FIGS. 1A and 1B illustrate a stator and a rotor for a permanent magnet electric motor having four magnetic poles and twenty rotor teeth.
Figure 1A:
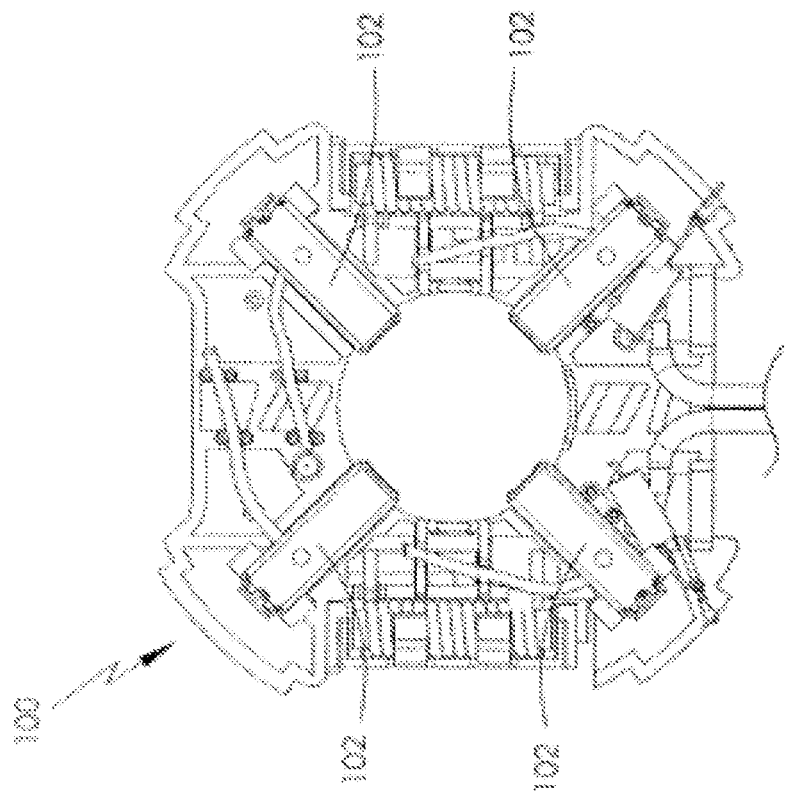
Figure 1C:
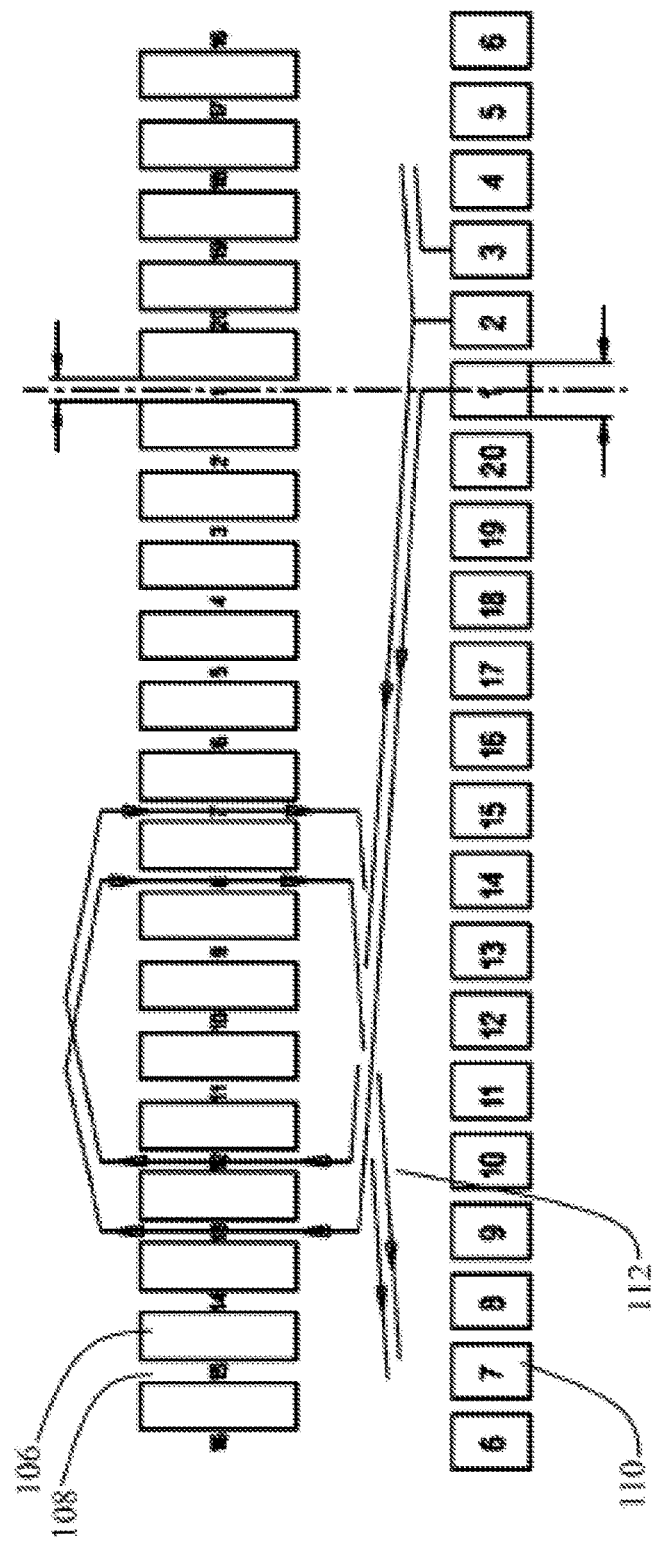
FIG. 1C is a schematic diagram illustrating lap windings for a permanent magnet electric motor.
Figure 2A:
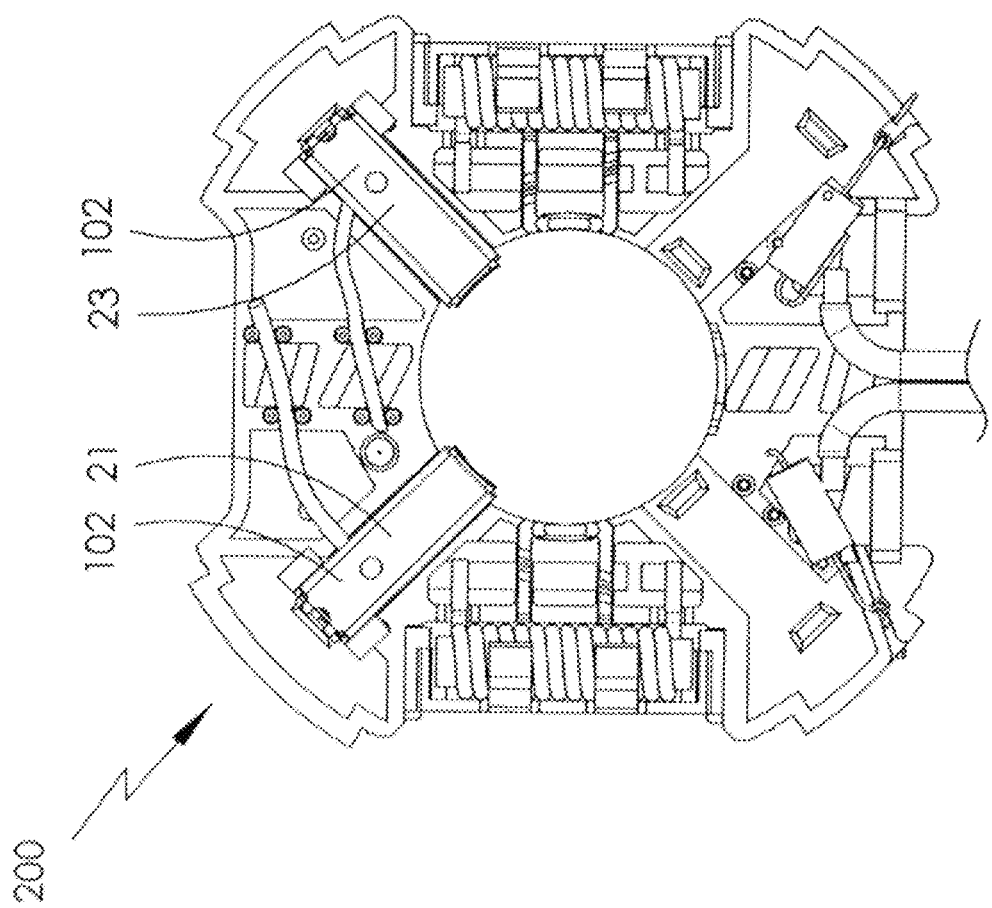
FIG. 2A illustrates a four-pole permanent magnet electric motor having two brushes in accordance with some embodiments.
Figure 2B:
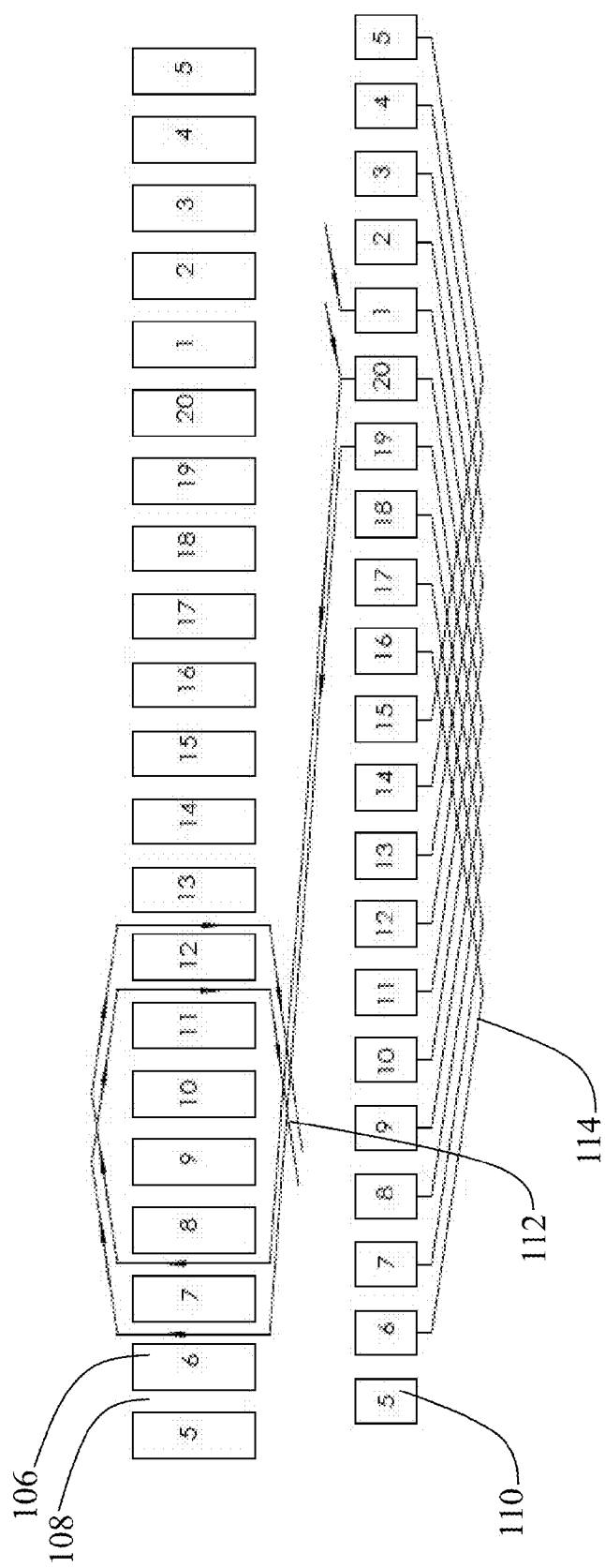
FIG. 2B is a schematic diagram illustrating lap windings for a permanent magnet electric motor utilizing an equalizer.

Various features are described hereinafter with reference to the figures. It shall be noted that the figures are not drawn to scale, and that the elements of similar structures or functions are represented by like reference numerals throughout the figures. It shall also be noted that the figures are only intended to facilitate the description of the features for illustration and explanation purposes, unless otherwise specifically recited in one or more specific embodiments or claimed in one or more specific claims. The drawings figures and various embodiments described herein are not intended as an exhaustive illustration or description of various other embodiments or as a limitation on the scope of the claims or the scope of some other embodiments that are apparent to one of ordinary skills in the art in view of the embodiments described in the Application. In addition, an illustrated embodiment need not have all the aspects or advantages shown.

An aspect or an advantage described in conjunction with a particular embodiment is not necessarily limited to that embodiment and may be practiced in any other embodiments, even if not so illustrated, or if not explicitly described. Also, reference throughout this specification to "some embodiments" or "other embodiments" means that a particular feature, structure, material, process, or characteristic described in connection with the embodiments is included in at least one embodiment. Thus, the appearances of the phrase "in some embodiments", "in one or more embodiments", or "in other embodiments" in various places throughout this specification are not necessarily referring to the same embodiment or embodiments.

Some embodiments are directed to a permanent magnet DC motor comprising a stator and a rotor configured to interface with the stator. It will be understood that while the illustrated embodiments refer primarily to permanent magnet DC motors, other types of motors may be used in accordance with other embodiments.

In some embodiments, the stator comprises a plurality of permanent magnets forming 2P magnetic poles, wherein P is an integer greater than 1. For example, if P=2, the motor is a 4-pole motor, while if P=4, the motor is an 8-pole motor. While the illustrated embodiments refer primarily to 4-pole motors (P=2), it will be understood that other embodiments may have different numbers of magnetic poles (e.g., P=8).

The rotor may comprise an output shaft, a commutator, one or more rotor cores having a plurality of rotor teeth, and rotor windings wound around the rotor teeth. The commutator may comprise m commutator bars, wherein m is an even number greater than 2. In some embodiments, m is configured to be greater than P. In a preferred embodiment, m is an even number between 16 and 24 (i.e., 16, 18, 20, 22, or 24). The rotor windings comprise a plurality of coil elements each having two ends, wherein the two ends of each coil element are connected to a pair of commutator bars. In accordance with a preferred embodiment, the number of rotor teeth of the rotor core is equal to the number of commutator bars (i.e., m).

In some embodiments, the motor is a 4-pole, 20-groove permanent magnet DC motor (P=2, m=20). In other words, the permanent magnets mounted in the stator of the electric motor form 4 magnetic poles, while the rotor core comprises 20 rotor teeth, wherein each pair of adjacent rotor teeth defines a winding groove used to house a coil element, forming a total of 20 winding grooves.

Figure 3:
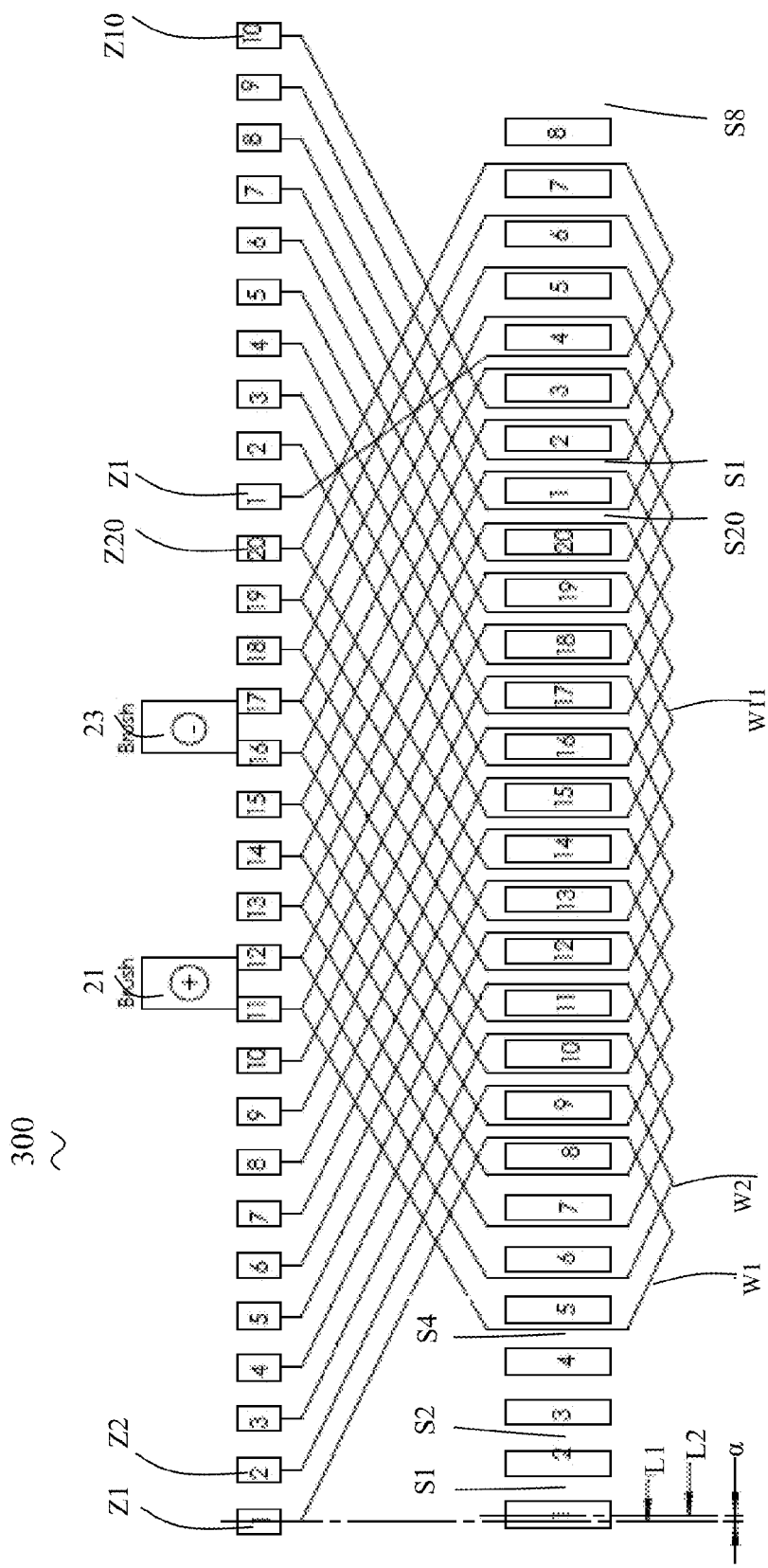
FIG. 3 is a schematic diagram illustrating wave windings for a permanent magnet electric motor in accordance with some embodiments.

FIG. 3 is a schematic diagram illustrating a winding layout 300 for a 4-pole, 20-groove electric motor having 20 commutator bars, in accordance with some embodiments. For illustrative purposes, FIG. 3 illustrates the commutator bars and rotor teeth spread out in a linear arrangement, instead of a substantially circular or annular configuration as would be on an actual motor.

The first row of FIG. 3 illustrates two electric brushes 21 and 23. In the illustrated embodiment, the electric motor utilizes a modified wave winding, and thus only uses two electric brushes 21 and 23, instead of four brushes as would be used in a conventional 4-pole electric motor. Compared to a conventional 4-pole electric motor, the reduced number of electric brushes and corresponding brush housings and springs serves to reduce the cost and complexity of the assembly, as well as reducing the weight of the motor.

The second row of FIG. 3 illustrates the 20 commutator bars of the commutator (Z1 through Z20). For illustrative purposes, the figure repeats Z1 through Z10 after Z20. The third row of FIG. 3 illustrates the 20 rotor teeth of the rotor core. Each pair of adjacent rotor teeth defines a winding groove, such that the 20 rotor teeth collectively define 20 winding grooves S1 through S20. Similar to the commutator bars, for illustrative purposes, the figure repeats winding grooves S1 through S8 after S20. A plurality of coil elements (W1 through W20) are wrapped around the rotor teeth and accommodated by the winding grooves (S), and connected to corresponding pairs of commutator bars (Z).

Figure 4:
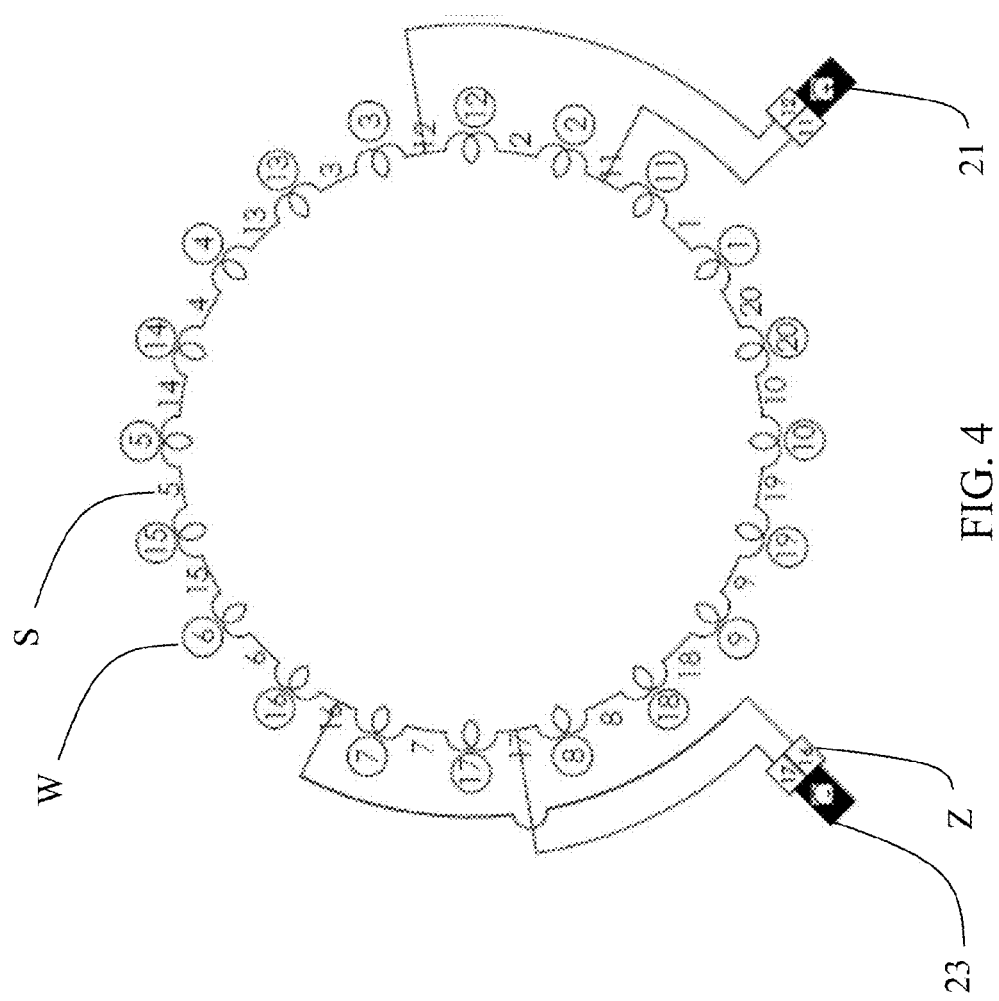
FIG. 4 is a schematic diagram showing the connections between coil elements, winding grooves, and commutator bars in accordance the embodiment illustrated in FIG. 3.

FIG. 4 illustrates the relationship between the coil elements (W), winding grooves (S), and commutator bars (Z) in accordance with an embodiment illustrated in FIG. 3.

As illustrated in FIG. 3 and FIG. 4, a coil element W1 at one end begins at commutator bar Z1, enters winding groove S8, and is wound around the rotor teeth between winding grooves S8 and S4 one or more times. Coil element W1 then exits from winding groove S4, with the other end attached to commutator bar Z11. A second coil element W11 starts from commutator bar Z11, enters winding groove S18, loops around the rotor teeth between S18 and S14, and exits from winding groove S14 to be connected to commutator bar Z2.

In a similar manner, coil element W2 connects to commutator bar Z2 at one end, and to Z12 at the other, while coil element W12 connects Z12 and Z3. The relationship among commutator bars (Z), coil elements (W), and winding grooves (S) are illustrated below in Table 1. Each coil element is connected to a first commutator bar on one end, enters a first winding groove (entrance groove), exits from a second winding groove (exit groove), and is connected to a second commutator bar on the opposite end.

TABLE 1

| Comm. Bar | Coil Element | | Comm. Bar | Coil Element | | Comm. Bar |
|---|---|---|---|---|---|---|
| | # | Entrance Groove | Exit Groove | | # | Entrance Groove | Exit Groove | |
| Z1 | W1 | S8 | S4 | Z11 | W11 | S18 | S14 | Z2 |
| Z2 | W2 | S9 | S5 | Z12 | W12 | S19 | S15 | Z3 |
| Z3 | W3 | S10 | S6 | Z13 | W13 | S20 | S16 | Z4 |
| Z4 | W4 | S11 | S7 | Z14 | W14 | S1 | S17 | Z5 |
| Z5 | W5 | S12 | S8 | Z15 | W15 | S2 | S18 | Z6 |
| Z6 | W6 | S13 | S9 | Z16 | W16 | S3 | S19 | Z7 |
| Z7 | W7 | S14 | S10 | Z17 | W17 | S4 | S20 | Z8 |
| Z8 | W8 | S15 | S11 | Z18 | W18 | S5 | S1 | Z9 |
| Z9 | W9 | S16 | S12 | Z19 | W19 | S6 | S2 | Z10 |
| Z10 | W10 | S17 | S13 | Z20 | W20 | S7 | S3 | Z1 |

As can be seen in Table 1, each pair of adjacent commutator bars (e.g., Z1 and Z2, Z2 and Z3) are generally connected to the ends of P (e.g., P=2 in the illustrated embodiment) serially-connected coil elements. For example, adjacent commutator bars Z1 and Z2 are connected through the two coil elements W1 and W11, while adjacent commutator bars Z2 and Z3 are connected through coil elements W2 and W12. As an exception to the general rule, commutator bars Z20 and Z1 are connected through only 1 (P−1) coil element (W20). As another exception, commutator bars Z10 and Z11 are connected by the ends of 3 (P+1) serially-connected coil elements (W10, W20, and W1).

In summary, where the electric motor has 2P magnetic poles (wherein P is an even number greater than 1), and m commutator bars (wherein m is an even number greater than P), the wave windings in accordance with some embodiments exhibit the following features:

(1) With regards to the m commutator bars forming m pairs of adjacent commutator bars, one pair of adjacent commutator bars (e.g., Z20 and Z1) will be connected by the two ends of P−1 serially-connected coil elements, while another pair of adjacent commutator bars (e.g., Z10 and Z11) will be connected by the two ends of P+1 serially-connected coil elements. With regards to the remaining m−2 pairs of adjacent commutator bars, each pair of adjacent commutator bars will be each connected by the two ends of P serially-connected coil elements.

(2) The two ends of each coil element are connected to two commutator bars, the two commutator bars being either adjacent (e.g., commutator bars Z20 and Z1) or separated by a predetermined distance. The predetermined distance may be substantially equal to a number of commutator bars corresponding to two magnetic poles of the motor. For example, for an electric motor having 4 poles and 20 commutator bars, each magnetic pole corresponds to 5 commutator bars. Commutator bars Z1 and Z11 (connected by coil element W1) are located on substantially diametrically opposite positions on the commutator, and separated by 10 commutator bars, which is substantially equal to the number of commutator bars corresponding to two magnetic poles. Commutator bars Z11 and Z2 (connected by coil element W11) are also substantially diametrically opposed on the commutator, and separated by 11 commutator bars, which is substantially equal to the number of commutator bars corresponding to two magnetic poles.

It should be understood that the term "substantially," such as in "substantially diametrically opposed on the commutator" is used herein to indicate certain features, can refer to either an exact feature or a feature that is slightly offset or otherwise not perfect. For example, Z1 and Z11 are exactly diametrically opposite on an embodiment having 20 commutator bars, being separated by 10 commutator bars, and thus can be considered to be "substantially diametrically opposed on the commutator." However, pairs of commutator bars may be considered to be "substantially diametrically opposed on the commutator" despite being slightly offset from being exactly diametrically opposed (e.g., an 11 or a 12 commutator bar separation).

Similarly, "substantially equal to the number of commutator bars corresponding to two magnetic poles" may indicate a number of commutator bars exactly equal to the number of commutator bars corresponding to two magnetic poles (e.g., 10 commutator bars in a 4-pole, 20-groove motor), or a number of commutator bars offset by one or two commutator bars from the number corresponding to two magnetic poles (e.g., 8, 9, 11, or 12 commutator bars).

It shall be understood that while the illustrated embodiments describe an electric motor having 4 magnetic poles, other embodiments may apply to a motor with greater than 4 magnetic poles. For example, P may be equal to 2, 3, 4, or any other integer greater than 1.

In accordance with a preferred embodiment, the number of rotor teeth is equal to the number of commutator bars m. The m rotor teeth define m winding grooves housing or accommodating the coil elements of the rotor windings.

Referring to FIG. 3, the rotor teeth on the rotor core are equal in number to the number of commutator bars. In some embodiments, the commutator bars and their corresponding rotor teeth may be circumferentially offset from each other by a predetermined angle. For example, L1 corresponds to the center line of commutator bar Z1, while L2 corresponds to the center line of the rotor tooth corresponding to commutator bar Z1. L1 and L2 are circumferentially offset by a predetermined angle α. Angle α is defined as the angle between a first plane defined by the center line L1 of commutator bar Z1 and the center of the rotor, and a second plane defined by the center line L2 of a corresponding rotor tooth and the center of the rotor. In a preferred embodiment, angle α is configured to be greater than 0 degrees but less than 12 degrees, with the offset being in either a circumferentially clockwise or counterclockwise direction. In another preferred embodiment, angle α is configured to be between 0 and 9 degrees.

Figure 5:
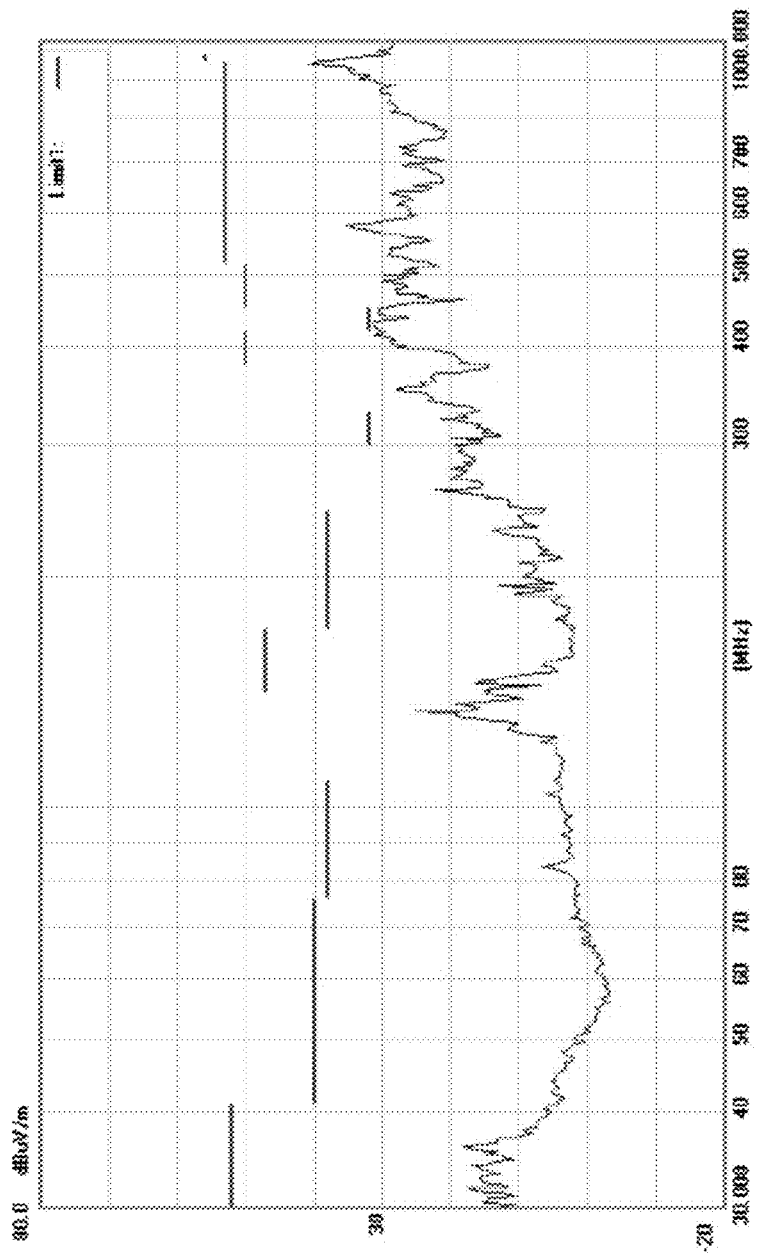
FIG. 5 illustrates EMI test results for a 4-pole 20-groove permanent magnet electric motor using wave windings in accordance with some embodiments.
Figure 6:
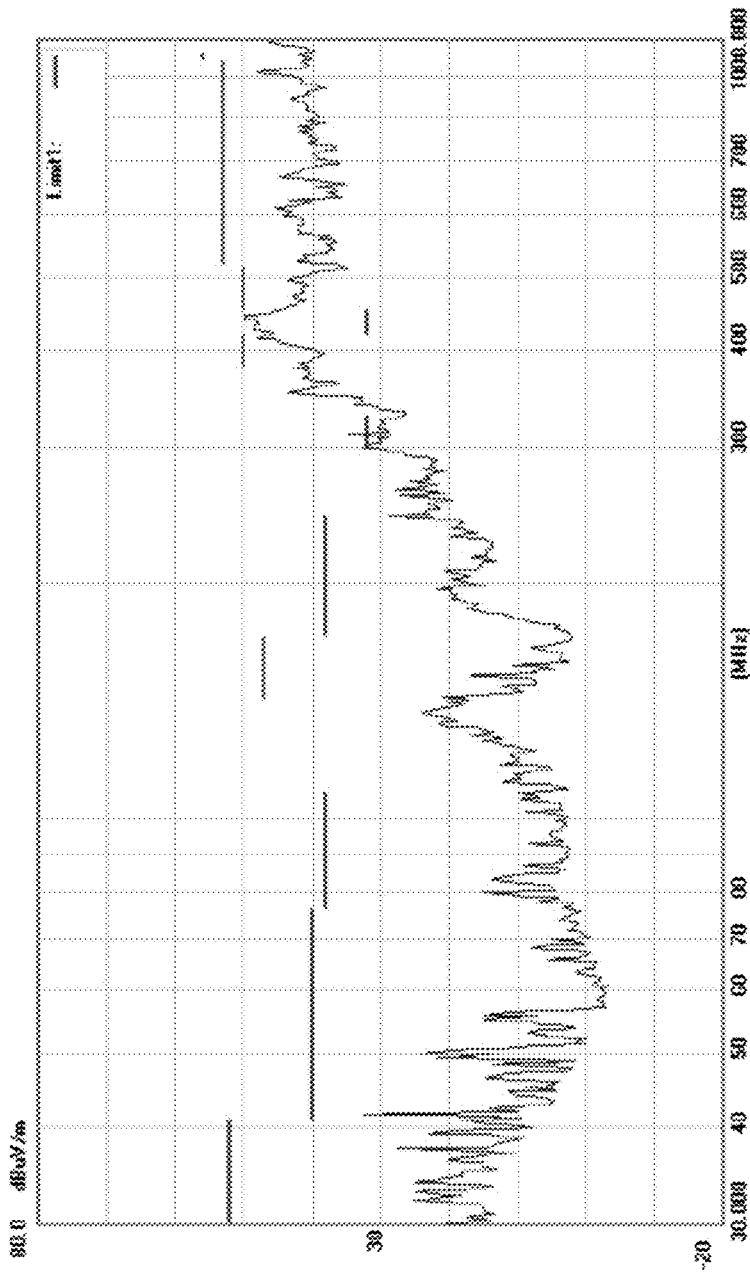
FIG. 6 illustrates EMI test results for a conventional 4-pole 20-groove permanent magnet electric motor.

FIG. 5 illustrates EMI test results for a 4-pole 20-groove permanent magnet electric motor using wave windings in accordance with the above illustrated embodiment. FIG. 6 illustrates EMI test results for a conventional 4-pole 20-groove permanent magnet electric motor. In the graphs illustrated in FIG. 5 and FIG. 6, the x-axis corresponds to EMI frequency measured in megahertz (MHz), while the y-axis measures EMI field strength over distance on a logarithmic scale (dBμV/m). It is generally desirable to reduce the EMI of the motor. For example, in accordance with Federal Communications Commission (FCC) regulations, the EMI field strength in the frequency range of 30 to 88 MHz over 3 meters must be below 40 dBμV/m. As can be seen in the figures, a 4-pole 20-groove permanent magnet electric motor experiences better EMI characteristics (lower EMI field strength) in comparison to a conventional electric motor.

Table 2 illustrates the winding arrangement of a 4-pole 20-groove permanent magnet DC motor in accordance with an alternative embodiment.

TABLE 2

| Comm. Bar | Coil Element | | | Comm. Bar | Coil Element | | |
|---|---|---|---|---|---|---|---|
| | # | Entrance Groove | Exit Groove | | # | Entrance Groove | Exit Groove | Comm. Bar |
| Z1 | W1 | S8 | S4 | Z11 | W11 | S18 | S14 | Z20 |
| Z20 | W2 | S9 | S5 | Z10 | W12 | S19 | S15 | Z19 |
| Z19 | W3 | S10 | S6 | Z9 | W13 | S20 | S16 | Z18 |
| Z18 | W4 | S11 | S7 | Z8 | W14 | S1 | S17 | Z17 |
| Z17 | W5 | S12 | S8 | Z7 | W15 | S2 | S18 | Z16 |
| Z16 | W6 | S13 | S9 | Z6 | W16 | S3 | S19 | Z15 |
| Z15 | W7 | S14 | S10 | Z5 | W17 | S4 | S20 | Z14 |

TABLE 2-continued

| Coil Element | | | | Coil Element | | | |
|---|---|---|---|---|---|---|---|
| Comm. Bar | # | Entrance Groove | Exit Groove | Comm. Bar | # | Entrance Groove | Exit Groove | Comm. Bar |
| Z14 | W8 | S15 | S11 | Z4 | W18 | S5 | S1 | Z13 |
| Z13 | W9 | S16 | S12 | Z3 | W19 | S6 | S2 | Z12 |
| Z12 | W10 | S17 | S13 | Z2 | W20 | S7 | S3 | Z1 |

The winding scheme of the embodiment illustrated in Table 2 differs from the embodiment illustrated in FIGS. 3-5 and Table 1 in several respects. For example, in the embodiment illustrated in Table 1, coil element W1 starts from commutator bar Z1 and travels a distance of 10 commutator bars to Z11, followed by coil element W11 starting from commutator bar Z11 to commutator bar Z2, a distance of 11 commutator bars. On the other hand, in the embodiment illustrated in Table 2, coil element W1 spans 10 commutator bars from Z1 to Z11, while coil element W11 only spans 9 commutator bars from Z11 to Z19. As described above, distances of 10, 11, or 9 commutator bars may all be considered to be substantially equal to number of commutator bars corresponding to two magnetic poles.

Thus, electric motors in accordance with the present invention require only two electric brushes instead of four, while maintaining an even number of commutator bars and rotor teeth. This allows electric motors in accordance with the embodiments to be manufactured using the same rotor cores and commutators as conventional four-brush electric motors, requiring no additional investment in development and additional assembly lines, which potentially reduces manufacturing costs and complexity.

Figure 7:
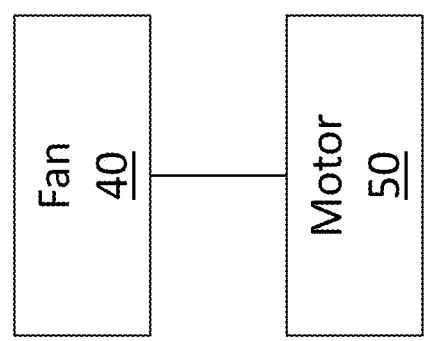
FIG. 7 illustrates a system for an automobile engine cooling system that includes a motor in accordance with some embodiments.

Applications of the present embodiments may be used for the home or industrial fields. For example, electric motors in accordance with some embodiments may be used in a cooling module for an automobile engine. As illustrated in FIG. 7, a cooling module for an automobile engine may comprise a fan 40 and a permanent magnet electric motor 50, wherein fan 40 is driven by motor 50 in order to cool the automobile engine.

In the foregoing specification, various aspects have been described with reference to specific embodiments thereof. It will, however, be evident that various modifications and changes may be made thereto without departing from the broader spirit and scope of various embodiments described herein. For example, the above-described systems or modules are described with reference to particular arrangements of components. Nonetheless, the ordering of or spatial relations among many of the described components may be changed without affecting the scope or operation or effectiveness of various embodiments described herein. In addition, although particular features have been shown and described, it will be understood that they are not intended to limit the scope of the claims or the scope of other embodiments, and it will be clear to those skilled in the art that various changes and modifications may be made without departing from the scope of various embodiments described herein. The specification and drawings are, accordingly, to be regarded in an illustrative or explanatory rather than restrictive sense. The described embodiments are thus intended to cover alternatives, modifications, and equivalents.

The invention claimed is:

1. An electric motor, comprising: a stator comprising a plurality of magnetic components forming 2P magnetic poles, wherein P is an integer greater than 1; and a rotor comprising: an output shaft; a commutator attached to the output shaft and comprising m commutator bars arranged to form m pairs of adjacent commutator bars, wherein m is an even number greater than 2; and rotor windings comprising a plurality of coil elements, a coil element having two ends connected to two of the m commutator bars, wherein; a pair of adjacent commutator bars is connected only through P−1 serially-connected coil elements; another pair of adjacent commutator bars is connected only through P+1 serially-connected coil elements.

2. The electric motor of claim 1, wherein each pair of m−2 remaining pairs of adjacent commutator bars is connected only through P serially-connected coil elements.

3. The electric motor of claim 2, wherein the rotor windings comprise the plurality of coil elements in wave windings.

4. The electric motor of claim 3, wherein the stator comprises no more than two electric brushes in sliding contact with the m commutator bars of the commutator.

5. The electric motor of claim 2, wherein P=2.

6. The electric motor of claim 2, wherein the rotor further comprises a rotor core having a plurality of rotor teeth, wherein adjacent rotor teeth of the plurality of rotor teeth define a plurality of winding grooves configured to accommodate portions of the plurality of coil elements.

7. The electric motor of claim 2, wherein a commutator bar of the m commutator bars is offset from a corresponding rotor tooth of the plurality of rotor teeth in a circumferential direction by a predetermined angle.

8. The electric motor of claim 7, wherein the predetermined angle is configured to be between 0 and 12 degrees.

9. The electric motor of claim 2, wherein two ends of each coil element is directly connected to two commutator bars, and the two commutator bars are adjacent or separated by a predetermined distance substantially equal to a number of commutator bars corresponding to two magnetic poles of the motor.

10. The electric motor of claim 9, wherein P=2, one coil element of the plurality of coil elements is connected to a pair of adjacent commutator bars, and the remaining coil elements of the plurality of coil elements are connected to commutator bars that are in substantially diametrically opposite positions on the commutator.

11. The electric motor of claim 2, wherein m is an even number between 16 and 24, inclusive.

* * * * *